US007895957B2

(12) United States Patent
Inomata et al.

(10) Patent No.: US 7,895,957 B2
(45) Date of Patent: Mar. 1, 2011

(54) HEAT EXCHANGER TUBE, METHOD OF MANUFACTURING HEAT EXCHANGER TUBE, AND FLUIDIZED-BED FURNACE

(75) Inventors: Hirotoshi Inomata, Tokyo (JP); Hiroshi Yoshida, Okayama (JP)

(73) Assignee: Dowa Holdings Co., Ltd., Tokyo (JP)

( * ) Notice: Subject to any disclaimer, the term of this patent is extended or adjusted under 35 U.S.C. 154(b) by 324 days.

(21) Appl. No.: 11/645,584

(22) Filed: Dec. 27, 2006

(65) Prior Publication Data
US 2007/0157859 A1 Jul. 12, 2007

(30) Foreign Application Priority Data
Dec. 28, 2005 (JP) ................ 2005-379720

(51) Int. Cl.
*F23M 9/10* (2006.01)
*F23G 5/30* (2006.01)
*F28F 21/08* (2006.01)
(52) U.S. Cl. ......... 110/324; 110/245; 165/172; 165/180; 112/512
(58) Field of Classification Search .......... 110/245; 165/172, 180
See application file for complete search history.

(56) References Cited

U.S. PATENT DOCUMENTS

| 4,028,785 | A |   | 6/1977 | Jackson et al. |  |
|---|---|---|---|---|---|
| 4,075,376 | A | * | 2/1978 | Jaeger | 165/180 |
| 4,766,952 | A | * | 8/1988 | Onodera | 165/95 |
| 4,915,038 | A | * | 4/1990 | Sujata et al. | 110/346 |
| 5,566,625 | A | * | 10/1996 | Young | 110/243 |
| 6,013,890 | A | * | 1/2000 | Hulsizer | 219/76.14 |
| 6,389,995 | B1 | * | 5/2002 | Adams et al. | 110/245 |
| 6,477,846 | B2 | * | 11/2002 | Yundt, Jr. | 165/94 |
| 6,781,083 | B1 |   | 8/2004 | Keller et al. |  |
| 2005/0167468 | A1 |   | 8/2005 | Kislovsky et al. |  |

FOREIGN PATENT DOCUMENTS

| DE | 3806044 A1 |   | 8/1989 |
|---|---|---|---|
| JP | 07090496 A | * | 4/1995 |
| JP | 10-030897 A |   | 2/1998 |
| JP | 10030897 A | * | 2/1998 |
| JP | 2002310594 A | * | 10/2002 |
| JP | 2004058062 A | * | 2/2004 |
| JP | 2004-093058 A |   | 3/2004 |
| JP | 2005-315566 A |   | 11/2005 |

OTHER PUBLICATIONS

The Engineering Toolbox, "Carbon, Alloy and Stainless Steel Pipes," retrieved Apr. 6, 2009, http://www.engineeringtoolbox.com/steel-pipes-dimensions-d_43.html.*
EPO Search Report, Reference D3722001EPP00Sv, App. No. 06026958.6-2301, May 9, 2007 (6 pages).

* cited by examiner

*Primary Examiner* — Kenneth B Rinehart
*Assistant Examiner* — David J Laux
(74) *Attorney, Agent, or Firm* — Rader, Fishman & Grauer PLLC (57) ABSTRACT

A heat exchanger tube 41 includes: a first cover layer 44 provided on an outer side of a tube main body 42 to partly or completely cover a tube main body 42; and a second cover layer 45 provided on an outer side of the first cover layer 44 to partly or completely cover the first cover layer 44. The first cover layer 44 is formed by overlay-welding a material higher in ductility than the second cover layer 45 to the tube main body 42. The second cover layer 45 is formed by overlay-welding a material higher in hardness than the first cover layer 44 to the first cover layer 44.

9 Claims, 8 Drawing Sheets

HEAT EXCHANGER TUBE, METHOD OF MANUFACTURING HEAT EXCHANGER TUBE, AND FLUIDIZED-BED FURNACE

BACKGROUND OF THE INVENTION

1. Field of the Invention

The present invention relates to a heat exchanger tube, a method of manufacturing a heat exchanger tube, and a fluidized-bed furnace.

2. Description of the Related Art

A fluidized-bed furnace for incineration disposal of waste includes a fluidized layer which is made of fluidized sand such as silica sand deposited on a furnace bed. The fluidized-bed furnace performs heating by blowing up the fluidized sand while jetting fluidizing gas such as air into the fluidized layer from the furnace bed, and a material to be incinerated such as waste is stirred while being mixed with the fluidized sand at a high temperature, whereby the material to be incinerated is dried, thermally decomposed, and incinerated.

In a furnace casing of such a fluidized-bed furnace, a heat exchanger tube (cooling tube) is provided to adjust the temperature of the fluidized sand and the material to be incinerated (see, Japanese Patent Application Laid-open No. 2004-93058 and Japanese Patent Application Laid-open No. 2005-315566). A refrigerant such as water is made to flow through the inside of the heat exchanger tube, and the fluidized sand and the material to be incinerated which come into contact with a surface of the heat exchanger tube are cooled by being heat-exchanged with the refrigerant in the heat exchanger tube via inner and outer surfaces of the heat exchanger tube.

Generally, materials of heat exchanger tubes used in various apparatuses are selected in consideration of heat resistance against temperatures of atmospheres in which the heat exchanger tubes are used. For example, carbon steel is mainly used in an atmosphere of 350° C. or lower, a low-alloy steel in an atmosphere of 500° C. or lower, a chromium-containing steel (Cr: 9% to 12%) in an atmosphere of 550° C. or lower, and austenitic stainless steel in an atmosphere of 550° C. or higher.

However, the temperature to which the heat exchanger tube is exposed in the fluidized-bed furnace ranges from about 500° C. to about 1100° C., and in addition, in the fluidized-bed furnace, highly corrosive gas containing HCl (hydrogen chloride), $Cl_2$ (chlorine), or the like is generated by the incineration disposal of a material to be incinerated. Further, around the heat exchanger tube, the fluidized sand and the material to be incinerated are actively fluidized. In particular, sharp and hard substances such as incombustible metal pieces and sands are mixed in the material to be incinerated, and these substances incessantly collide with the heat exchanger tube. Conventionally, it has been difficult for a heat exchanger tube to exhibit sufficiently high performance even under such an environment and it has not been possible to satisfy all of heat resistance against high temperature in the fluidized-bed furnace, abrasion resistance against the contact of the fluidized sand and the material to be incinerated, strength against pressure generated by the blowing of the fluidizing gas, corrosion resistance against the corrosive gas, ductility which prevents cracking even if the heat exchanger tube expands and contracts in accordance with a temperature change, heat conductivity which enables efficient adjustment of the temperature of the fluidized sand and the material to be incinerated, and so on. Consequently, deterioration such as abrasion, damage, corrosion, and cracking easily occurred in the heat exchanger tube and thus it has been difficult to prolong the life of the heat exchanger tube, which consequently has necessitated frequent inspection, repairing, replacement, and the like of the heat exchanger tube. This has made it difficult to reduce trouble and cost required for such works.

SUMMARY OF THE INVENTION

The present invention was made in view of the above problems, and an object thereof is to provide a heat exchanger tube which has high abrasion resistance and corrosion resistance even under a high-temperature and highly corrosive environment and thus is excellent in durability, and a method of manufacturing such a heat exchanger tube. It is another object to provide a fluidized-bed furnace including such a heat exchanger tube.

In order to solve the above problems, according to the present invention, provided is a heat exchanger tube whose channel provided in a tube main body is heat-exchanged with an external part of the tube main body, the heat exchanger tube including: a first cover layer which is provided on an outer side of the tube main body to partly or completely cover the tube main body; and a second cover layer which is provided on an outer side of the first cover layer to partly or completely cover the first cover layer, wherein the first cover layer is made of a material higher in ductility than the second cover layer, and wherein the second cover layer is made of a material higher in hardness than the first cover layer.

The first cover layer and the second cover layer may be made of materials higher in corrosion resistance against an external atmosphere than the tube main body. The tube main body may be made of a material higher in heat conductivity than the first cover layer and the second cover layer. The first cover layer and the second cover layer may be smaller in thickness than the tube main body.

A material of the tube main body may be carbon steel or low-alloy steel. The material of the first cover layer may be austenitic stainless steel. The material of the second cover layer may be a chromium alloy.

According to another aspect of the present invention, provided is a method of manufacturing one of the above heat exchanger tubes, the method including: forming the first cover layer by applying overlay-welding to the tube main body; and forming the second cover layer by applying overlay-welding to the first cover layer. According to still another aspect of the present invention, provided is a fluidized-bed furnace which incinerates a material to be incinerated while fluidizing a fluidized medium in a furnace casing, the fluidized-bed furnace including the heat exchanger tube corresponding to any one of the characteristics described above.

The second cover layer may be provided on a portion where the heat exchanger tube comes in contact with the fluidized medium. The heat exchanger tube may include a plurality of straight-tube portions which are arranged in substantially parallel to one another. Further, the plural straight-tube portions may be disposed at different heights respectively, with a length direction of each of the plural straight-tube portions set in a lateral direction. The second cover layer may be provided at least on a lower portion of a straight-tube portion positioned on a lowest tier among the plural straight-tube portions. Further, the tube main bodies of the straight-tube portions adjacent to each other may be in contact with each other, and the second cover layer may be provided on a portion apart from a portion where the tube main bodies of the straight-tube portions are in contact with each other.

According to the present invention, the tube main body can be protected by the first cover layer and the first cover layer can be protected by the second cover layer. Forming the first cover layer by overlay-welding makes it possible to more firmly join the first cover layer to the tube main body. Further, forming the second cover layer by overlay-welding makes it possible to more firmly join the second cover layer to the first cover layer. Providing the first cover layer between the tube main body and the second cover layer makes it possible to prevent a crack to progress to the tube main body even if the crack occurs in the second cover layer. This allows the heat exchanger tube to have sufficient durability. Accordingly, the frequency of inspection, repairing, replacement, and so on of the heat exchanger tube can be decreased, which can reduce cost such as labor expenses and equipment expenses required for the inspection, repairing, replacement, and so on of the heat exchanger tube.

DETAILED DESCRIPTION OF THE INVENTION

Figure 1:
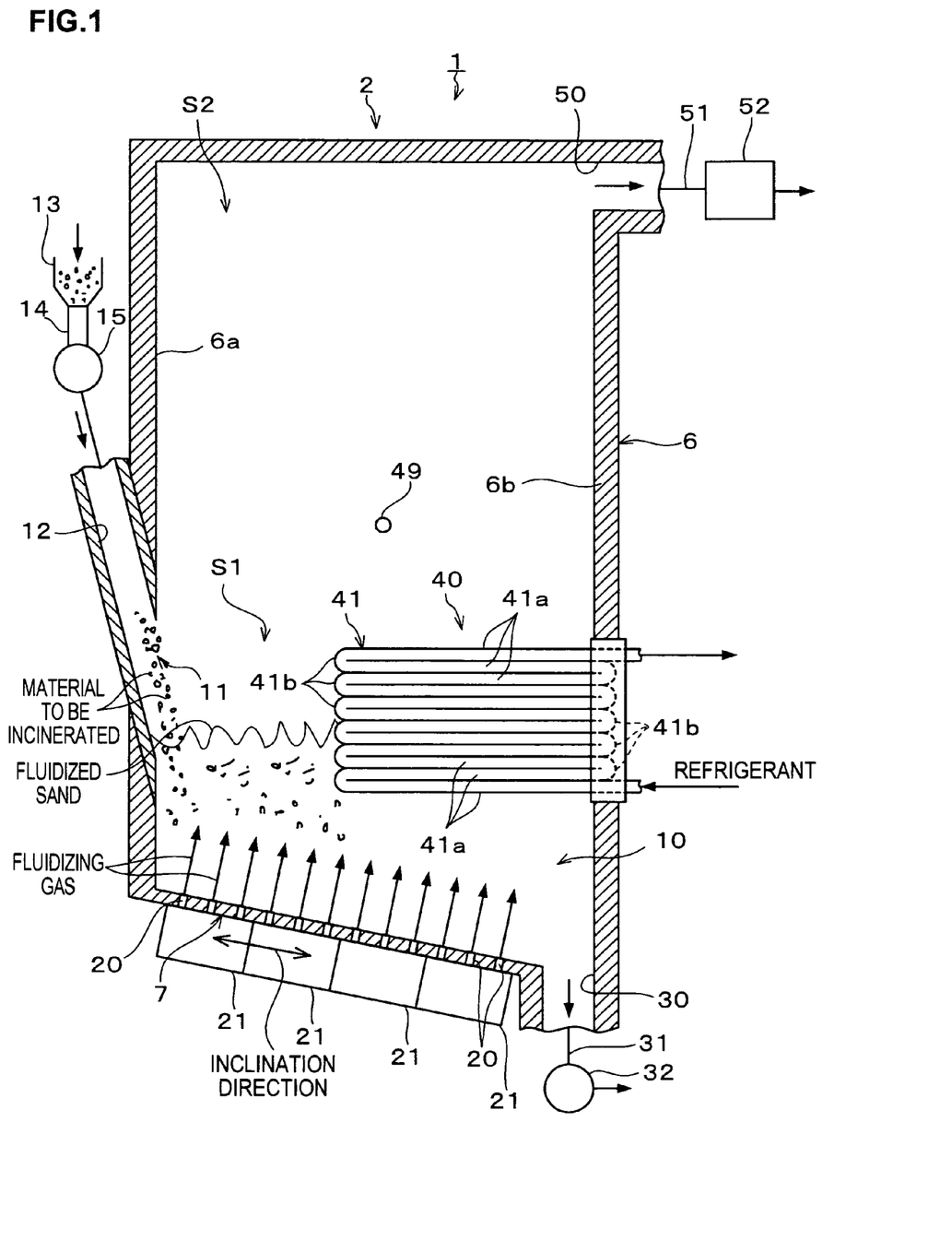
FIG. 1 is a schematic vertical cross-sectional view of a fluidized-bed furnace according to an embodiment.

Hereinafter, preferred embodiments of the present invention will be described based on a fluidized-bed furnace which incinerates shredder dust of a discarded automobile as a material to be incinerated. A fluidized-bed furnace 1 shown in FIG. 1 is an oblique-dispersion type fluidized layer incinerator and has a furnace casing 2 in a substantially rectangular shape. In an inner space of the furnace casing 2, a lower portion is a primary combustion chamber S1 in which a material to be incinerated is combusted (primary combustion), and an upper portion is a secondary combustion chamber (freeboard) S2 in which exhaust gas generated by the primary combustion of the material to be incinerated is combusted (second combustion).

Figure 2:
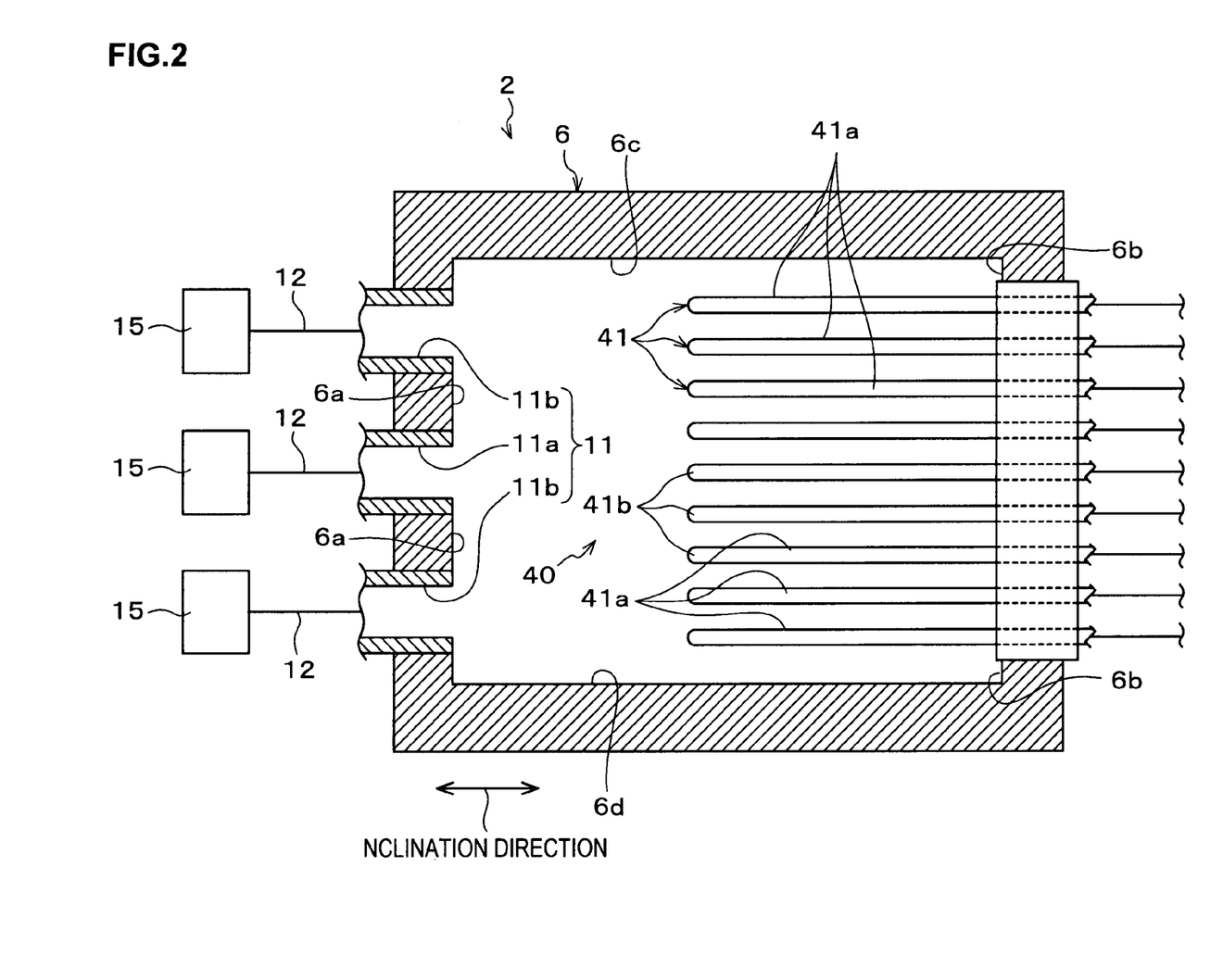
FIG. 2 is a schematic horizontal cross-sectional view of the fluidized-bed furnace.

A sidewall portion 6 of the furnace casing 2 is in a substantially angular tube shape having an almost uniform horizontal cross section in a substantially rectangular shape, and has four inner side surfaces provided to extend in a substantially vertical direction, namely, an inner front surface 6a, an inner rear surface 6b, an inner left surface 6c, and an inner right surface 6d shown in FIG. 2. A furnace bed 7 of the furnace casing 2 is in a substantially rectangular shape and is inclined so that it becomes gradually lower from a front side (left in FIG. 1) toward a rear side (right in FIG. 1), with its width direction set in a left and right direction (direction from a near side to a far side in FIG. 1). That is, the furnace bed 7 is provided between the pair of inner front surface 6a and inner rear surface 6b facing each other so as to be inclined relative to a horizontal plane.

As shown in FIG. 1, on the furnace bed 7, that is, on a bottom portion of the primary combustion chamber S 1, fluidized sand such as, for example, silica sand, which is a granular fluidized medium, is deposited to form a fluidized layer 10 which combusts a material to be incinerated while stirring the material to be incinerated.

An inlet port 11 from which the material to be incinerated and the fluidized sand are put into the primary combustion chamber S1 is open in the furnace casing 2. The inlet port 11 is open in the inner front surface 6a above the fluidized layer 10. That is, the inlet port 11 is provided on a higher side in the inclination direction of the furnace bed 7. Paths 12 are connected to the inlet port 11. The material to be incinerated and the fluidized sand are put into hoppers 13 and are blended by blenders 14, and thereafter, are continuously supplied to the primary combustion chamber S1 via the paths 12 and the inlet port 11 at a predetermined supply rate by the operation of dust feeders 15.

As shown in FIG. 2, the inlet port 11 is composed of a center inlet port 11a disposed in a substantial center of the inner front surface 6a and inlet ports 11b, 11b disposed on left and right sides of the inlet port 11a in the inner front surface 6a, in a plane view. The dust feeders 15 and the paths 12 are connected to these inlet ports 11a, 11b, 11b respectively, and by controlling the operation of the dust feeders 15, it is possible to arbitrarily set a supply rate of the material to be incinerated and the fluidized sand supplied from the center inlet port 11a and supply rates of the material to be incinerated and the fluidized sand supplied from the inlet ports 11b, 11b on both sides thereof.

As shown in FIG. 1, in the whole furnace bed 7, provided are a plurality of fluidizing gas supply ports 20 through which fluidizing gas to blow up and fluidize the fluidized sand is supplied to the primary combustion chamber S1. An area under the furnace bed 7 is divided into a plurality of blowing portions 21. The fluidizing gas which contains air (oxygen) and the like is blown in from each of the blowing portions 21 via the fluidizing gas supply ports 20 and the fluidizing gas is ejected upward, so that the fluidized sand in the primary combustion chamber S1 is blown up to be stirred and fluidized, thereby forming the fluidized layer 10. A flow rate of the fluidizing gas supplied to each of the gas blowing portions 21 can be independently adjusted, and increasing/decreasing the blowing velocity of the fluidizing gas from each of the gas blowing portions 21 can adjust a height to which the fluidized sand is blown up.

As shown in FIG. 1, a takeout port 30 from which a cinder of the material to be incinerated (incombustible) and the fluidized sand are taken out from the primary combustion chamber S1 is provided in the furnace bed 7. The takeout port 30 is provided in the lowest portion on the lower side in the inclination direction of the furnace bed 7. A path 31 is connected to the takeout port 30. The cinder of the material to be incinerated and the fluidized sand which have dropped from the primary combustion chamber S1 to the path 31 via the takeout port 30 are carried out by the operation of a discharge device 32 and not-shown conveyor and the like. Then, after the cinder and the fluidized sand are sieved out by a not-shown sieve, the fluidized sand is returned again to the hoppers 13.

In the primary combustion chamber S1, a heat exchanger tube group 40 is provided to adjust temperature of the fluidized sand. The heat exchanger tube group 40 is provided diagonally above the furnace bed 7 (above the lower side), and includes a plurality of heat exchanger tubes (cooling tubes) 41 (see FIG. 2). As shown in FIG. 1, each of the heat exchanger tubes 41 is bent at a plurality of places to be alternately folded back toward an opposite side, and is structured such that a plurality of (twelve in the example in FIG. 1) straight-tube portions 41a in a substantially straight-tubular shape are arranged substantially in parallel to one another. Such heat exchanger tubes 41 are attached to the inner rear surface 6b in the furnace casing 2 to protrude toward the inner front surface 6a side. The plural straight-tube portions 41a are arranged at different heights along a substantially vertical plane and are disposed in multi tiers so as to be stacked on one another in the vertical direction. Each of the straight-tube portions 41a is substantially linearly disposed, extending substantially perpendicularly to the inner front surface 6a and the inner rear surface 6b, with its length direction set in the substantially horizontal direction. Curved portions 41b, which couple the straight-tube portions 41a, on the inner rear surface 6b side are buried in the inner rear surface 6b and those on the inner front surface side 6a face the inner front surface 6a. The plural heat exchanger tubes 41 having almost the same shape as described above are arranged in substantially parallel to one another at equal intervals between the inner left surface 6c and the inner right surface 6d in the furnace casing 2 as shown in FIG. 2, thereby constituting the heat exchanger tube group 40. The furnace bed 7 is inclined as previously described, and the heat exchanger tubes 41 are disposed to extend linearly along the inclination direction of the furnace bed 7 in the plane view, and each gap between the heat exchanger tubes 41 extends linearly along the inclination direction of the furnace bed 7 in the plane view.

As shown in FIG. 1, the heat exchanger tubes 41 are provided, for example, in a height range almost equal to a height range where the inlet port 11 is formed, but the fluidized sand and the material to be incinerated which are put from the inlet port 11 to drop do not collide directly with the heat exchanger tubes 41 and can be dropped onto the furnace bed 7 with allowance since the heat exchanger tubes 41 are provided on the lower side in the inclination direction of the furnace bed 7 and there is a sufficient space between the inlet port 11 and the heat exchanger tubes 41. Therefore, it is possible to prevent the heat exchanger tubes 41 from being damaged.

Further, in the heat exchanger tubes 41, some of the straight-tube portions 41a and the curved portions 41b on a lower side are buried in the fluidized layer 10, and the straight-tube portions 41a and the curved portions 41b on an upper side are disposed at a position higher than the fluidized layer 10. For example, in a state where the fluidized layer 10 is not fluidized, the straight-tube portions 41a on the first and second tiers from the bottom and the curved portions 41b coupling these are buried in the fluidized sand, and in a state where the fluidized layer 10 is fluidized, the straight-tube portions 41a positioned on the first to third tiers from the bottom and the curved portions 41b coupling these are buried in the fluidized sand.

Figure 3:
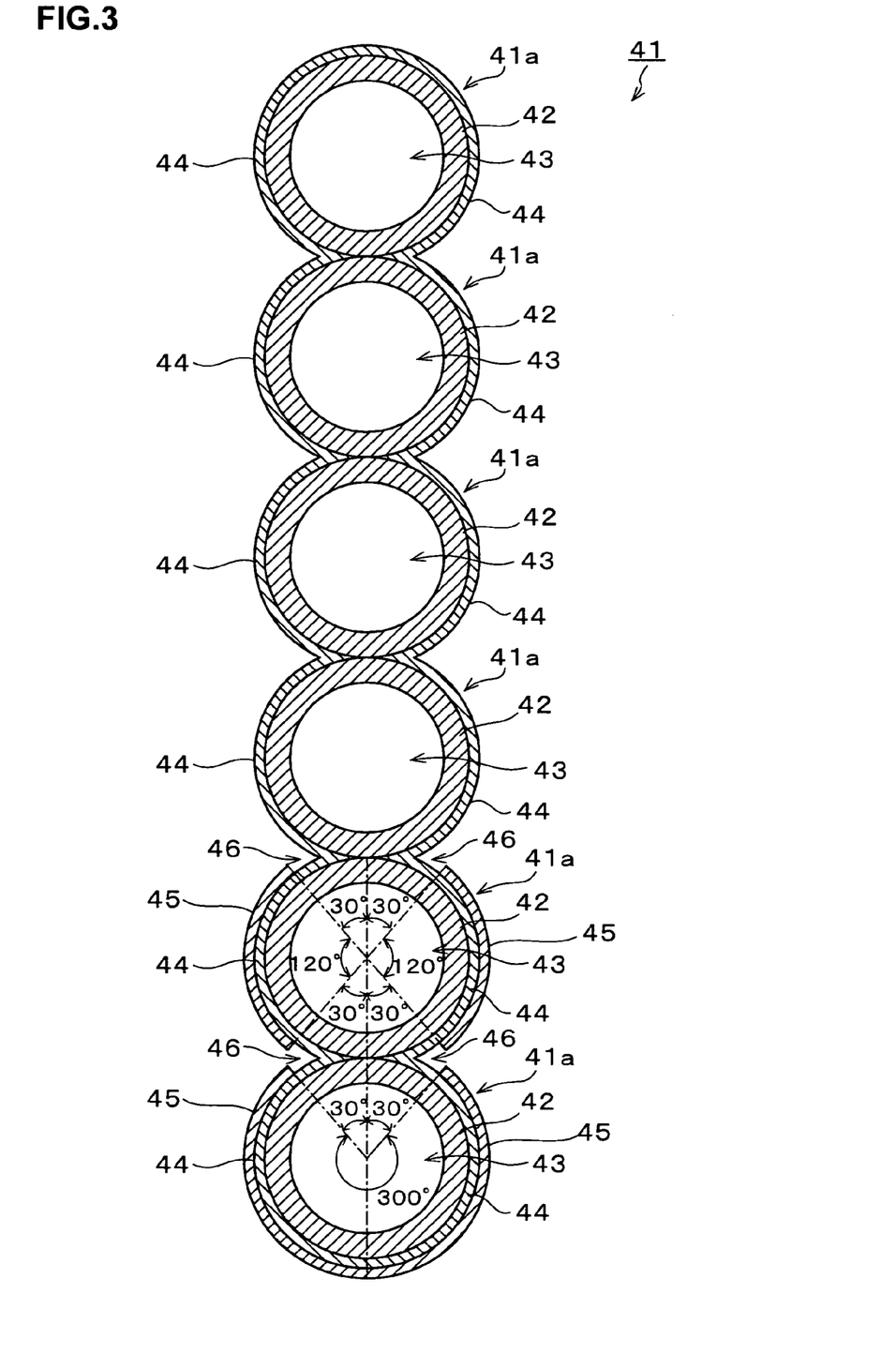
FIG. 3 is a vertical cross-sectional view of a heat exchanger tube.

FIG. 3 shows a cross section of the heat exchanger tube 41 taken along a plane substantially perpendicular to the longitudinal direction of the straight-tube portions 41a. As shown in FIG. 3, the heat exchanger tube 41 includes tube main bodies 42 with a substantially circular tubular shape and with almost uniform outside diameter and inside diameter. An inner space of each of the tube main bodies 42 has a substantially circular cross section and serves as a channel 43 through which a refrigerant such as, for example, water (vapor) is made to flow. Further, on outer sides of the tube main bodies 42, provided is a first cover layer 44 which completely covers the outer sides of the tube main bodies 42 and second cover layers 45 which partly cover an outer side of the first cover layer 44. In the shown example, the tube main bodies 42 of the straight-tube portions 41a vertically adjacent to each other are close to each other or in contact with each other, and the first cover layer 44 is laminated on all the straight-tube portions 41a and the curved portions 41b so as to cover the whole outer peripheral surfaces of the tube main bodies 42. On the other hand, the second cover layers 45 are formed on the straight-tube portion 41a on the lowest tier and the straight-tube portion 41a on the second tier from the bottom to cover outer peripheral surfaces of the first cover layer 44 partly in a circumferential direction. The second cover layer 45 is also formed on the curved portion 41b on the lowest tier among the curved portions 41b facing the front side, though not shown. The first cover layer 44 is formed by applying overlay-welding to the whole outer peripheral surfaces of the tube main bodies 42, with the tube main bodies 42 being base materials. The second cover layers 45 are formed by applying overlay-welding to the outer peripheral surface of the first cover layer 44. The first cover layer 44 and the second cover layers 45 are formed so that their thickness in a radial direction of the heat exchanger tube 41 is smaller than the thickness of the tube main bodies 42.

As each of the tube main bodies 42, used is a tube made of a material having high heat conductivity, sufficient heat resistance, and ductility high enough to prevent cracking due to thermal stress. Examples of such a tube are a tube made of low-carbon steel such as carbon steel tube for boiler/heat exchanger (for example, STB35E, STB340E, or the like), a tube made of low-alloy steel (chromium molybdenum steel) such as an alloy steel tube for boiler/heat exchanger (for example, STBA24 or the like), and the like. Note that the material of the tube main body 42 is higher in heat conductivity than the first cover layer 44 and the second cover layer 45. As for the size of each of the tube main bodies 42, the outside diameter may be, for example, about 76.2 mm and the thickness of the tube main body 42 in the radial direction may be, for example, about 8 mm.

As a material of the first cover layer 44, used is a material having sufficient heat resistance and corrosion resistance and capable of exhibiting ductility on the same level as that of the material of the tube main bodies 42. Examples of such a material are austenitic stainless steel (desirably, austenitic stainless steel low in carbon concentration to which molybdenum (Mo) is added, SUS309MoL, and the like) and the like. The austenitic stainless steel has corrosion resistance against corrosive gas (including HCl gas (hydrogen chloride gas), $Cl_2$ gas (chloride gas), and the like) generated by the incineration disposal of the material to be incinerated in the furnace casing 2, and is more corrosion-resistant than the material of the tube main bodies 42. That is, the first cover layer 44 has a property of being more corrosion-resistant than the tube main bodies 42 against a corrosive atmosphere generated in the outside of the heat exchanger tube 41, and by covering the whole outer surfaces of the tube main bodies 42 with the first cover layer 44, it is possible to protect the tube main bodies 42 and thus suitably prevent damage and corrosion of the tube main bodies 42. Moreover, the austenitic stainless steel is not easily hardened even at a high temperature, which allows the first cover layer 44 to deform together with the tube main bodies 42 when the tube main bodies 42 expand and contract in accordance with a temperature change. Therefore, even when the tube main bodies 42 are completely covered with the first cover layer 44, thermal deformation of the tube main bodies 42 is not obstructed and thus the tube main bodies 42 can be prevented from being broken by thermal stress. Furthermore, the first cover layer 44 can be prevented from being peeled off from the tube main bodies 42 and thus is capable of surely protecting the tube main bodies 42.

As previously described, the first cover layer 44 is formed by applying overlay-welding to the outer surfaces of the tube main bodies 42. The overlay-welding can be automated by, for example, arc welding, gas welding, or the like using an automatic welding apparatus. Weld bead are extended, for example, along the length direction of the tube main bodies 42. When the first cover layer 44 is thus formed by the hard-facing, fusion occurs in boundary portions between the outer surfaces of the tube main bodies 42 (base materials) and the first cover layer 44, and consequently, the first cover layer 44 can be surely joined to the tube main bodies 42 and the bonding firmness in this case can be higher than when the first cover layer 44 is joined to the tube main bodies 42 by spray welding, pressure welding, or the like. Therefore, the first cover layer 44 can be prevented from being peeled off from the tube main bodies 42 to surely protect the tube main bodies 42. Further, since the first cover layer 44 is not easily peeled off from the tube main bodies 42 even if suffering friction or impact for a long time, it is possible to prolong the life of the heat exchanger tube 41.

Incidentally, the spray welding is a method to form a coating film by making a jointing material (spray-welding material) in a molten form collide with a base material. In this method, since the base material and the jointing material do not become fused in each other, an impact given to the jointing material, if large, may possibly cause the jointing material to be easily peeled off from the base material. On the other hand, in the overlay-welding, the jointing material and the base material are fused in each other in a boundary portion thereof to be welded, and thus the overlay-welding can more firmly join the jointing material and the base material than the spray welding, which can prevent the jointing material from being peeled off from the base material.

The first cover layer 44 is formed so that its thickness in the radial direction of the heat exchanger tubes 41 is smaller than the thickness of the tube main bodies 42. The thickness of the first cover layer 44 is, for example, about 3 mm to about 5 mm. Incidentally, the first cover layer 44 may have a thickness of 3 mm or less, but in this case, there is a possibility that the first cover layer 44 cannot have sufficient performance since an excessive amount of a component of the tube main bodies 42 is fused in the first cover layer 44. Another conceivable inconvenience is that the first cover layer 44 comes to have uneven thickness. To avoid such inconveniences, processing conditions have to be optimized, which makes the processing difficult. On the other hand, increasing the thickness of the first cover layer 44 is advantageous in improving the strength of the first cover layer 44, but in a case where, for example, austenitic stainless steel or the like is used as the material of the first cover layer 44 as described above, making the first cover layer 44 too thick results in poor heat conductivity of the first cover layer 44 due to lower heat conductivity of the austenitic stainless steel or the like than that of the material of the tube main bodies 42, which may possibly deteriorate a temperature adjustment function of the heat exchanger tube 41. Further, the larger the thickness of the first cover layer 44, the higher processing cost is required. Therefore, it is desirable that the first cover layer 44 has a thickness of about 3 mm to about 5 mm in view of the function of the first cover layer 44, workability of the overlay-welding, economic efficiency, and so on.

As a material of the second cover layers 45, used is a hard-facing material having sufficient heat resistance, corrosion resistance, and abrasion resistance, for example, a chromium alloy of the like mainly composed of Fe (iron). Further, Vickers hardness (Hv) of such a hard-facing material is desirably about 500 or more. In this embodiment, used is a chromium alloy (nominal hardness: Hv 900) containing, by mass %, about 5% to about 6% C (carbon), about 22% Cr (chromium), about 6% Nb (niobium), about 7% to about 8% other trace elements (impurities), and the balance Fe. The chromium alloy has a property of having corrosion resistance against corrosive gas similarly to the aforesaid austenitic stainless steel and being higher in corrosion resistance than the material of the tube main bodies 42. That is, the second cover layers 45 have a property of being higher in corrosion resistance against a corrosive atmosphere generated outside the heat exchanger tube 41 than the tube main bodies 42. Further, the chromium alloy is higher in hardness than the material of the tube main bodies 42 and the austenitic stainless steel and is excellent in abrasion resistance. That is, the second cover layers 45 are harder than the tube main bodies 42 and the first cover layer 44, and by covering the first cover layer 44 with the second cover layers 45, it is possible to protect the first cover layer 44 and suitably prevent damage and abrasion of the first cover layer 44. Incidentally, average harness of the whole chromium alloy is about Hv 900, but chromium-based carbide crystals are precipitated on a surface of the chromium alloy, that is, on surfaces of the second cover layers 45, and the crystals have high surface hardness of about Hv 1000 or more and have high corrosion resistance against chloride gas even under high temperature. Thus, the chromium alloy has very excellent properties and is suitable as a material of the second cover layers 45.

The chromium alloy is easily hardened at high temperature and is highly brittle to be easily cracked, and therefore if the chromium alloy is directly welded to the outer peripheral surfaces of the tube main bodies 42, a crack occurring in a layer of the chromium alloy might spread to the tube main bodies 42. In this case, the crack might progress deep to break the tube main bodies 42. Further, if corrosive gas enters the crack, there is a risk that the tube main bodies 42 might be exposed to the corrosive gas to get corroded. On the other hand, in this embodiment, the second cover layers 45 as chromium alloy layers are welded on the, first cover layer 44 higher in ductility than the second cover layers 45 and not easy to be cracked, and in this manner, the second cover layers 45 are provided indirectly on the tube main bodies 42, so that it is possible to prevent the crack occurring in the second cover layers 45 from spreading to the tube main bodies 42. That is, the first cover layer 44 interposed between the second cover layer 45 and the tube main bodies 42 functions as a buffer against the progress of the crack, so that the tube main bodies 42 are suitably protected from the crack and breakage.

The second cover layers 45 as described above are formed to reinforce portions, in the first cover layer 44, which suffer especially strong impact and friction from the fluidized layer 10 and thus are required to have high abrasion resistance. In particular, the outer surface of the straight-tube portion 41a on the lowest tier is most likely to be damaged since the fluidized sand and the material to be incinerated blown up from under collide very vigorously with this straight-tube portion 41a. Therefore, it is preferable to provide the second cover layer 45 at least on a lower portion (lower surface) of the straight-tube portion 41a on the lowest tier. On the other hand, the straight-tube portions 41a and so on positioned on the upper tier side out of the plural straight-tube portions 41a are positioned above the fluidized layer 10 also when the fluidized layer 10 is fluidized, and scarcely come in contact with the fluidized sand and the material to be incinerated, and therefore need not be provided with the second cover layer 45. In the example shown in FIG. 3, the second cover layers 45 are provided on the straight-tube portions 41a on the first and second tiers from the bottom, that is, the straight-tube portions 41a which are buried in the fluidized layer 10 even when the fluidized layer 10 is not fluidized. On the other hand, the other straight-tube portions 41a on the third tier from the bottom to the uppermost tier suffer less impact and friction from the fluidized layer 10 than the straight-tube portions 41 a on the first and second tiers from the bottom and therefore are not provided with the second cover layer 45 and have the first cover layers 44 in an exposed state.

On the straight-tube portion 41a on the lowest tier, the second cover layer 45 is provided from the whole lower portion to the whole side portions of the straight-tube portion 41a so as to have a substantially C-shaped cross section. On the straight-tube portion 41a on the second tier from the bottom, the second cover layers 45 are provided to cover the whole side portions of the straight-tube portion 41a.

Further, on groove-shaped portions along a portion between the tube main bodies 42, that is, on grooved portions 46 on both sides of a place where an upper portion of the tube main body 42 on the lowest tier and a lower portion of the tube main body 42 on the second tier from the bottom are in contact with each other, the first cover layer 44 is exposed without any second cover layer 45 being provided, and the second cover layers 45 are provided on portions apart from the grooved portions 46. In the example in FIG. 3, portions where the second cover layer 45 is not formed on the straight-tube portion 41a on the lowest tier are, in a traverse plane of the straight tube portion 41a, portions subtending center angles of about 30°, the center being a center portion of the channel 43, with respect to a substantially vertical plane extending upward from the center portion. That is, the second cover layer 45 is continuously formed on a portion subtending the center angle of about 300°. Further, portions where the second cover layer 45 is not formed on the straight-tube portion 41a on the second tier from the bottom are, in the traverse plane of the straight tube portion 41a, portions subtending center angles of about 30°, the center being a center portion of the channel 43, with respect to a substantially vertical plane extending upward from the center portion, and portions subtending center angles of about 30° with respect to a substantially vertical plane extending downward from the center portion. That is, the second cover layer 45 is continuously formed on each of portions subtending the center angles of about 120° on both sides of the straight-tube portion 41a.

By thus forming the second cover layer 45 so as to cover part of the outer surface of the first cover layer 44 instead of completely covering it in a circumferential direction of each of the straight-tube portions 41a, the tube main bodies 42 and the first cover layer 44 can deform with allowance when they expand and contract in accordance with a temperature change. That is, it is possible to provide expansion margins allowing the tube main bodies 42 and the first cover layer 44 to expand in the circumferential direction (allowing the outside diameters thereof to expand) when the tube main bodies 42 and the first cover layer 44 are deformed under a high-temperature environment. Especially when the material of the second cover layers 45 is high-hardness metal and thus is low in ductility, excessively covering the whole first cover layer 44 with the second cover layer 45 would restrict the deformation of the tube main bodies 42 and the first cover layer 44 and does not allow the tube main bodies 42 and the first cover layer 44 to thermally expand in the circumferential direction, which may possibly generate an excessive stress to break the heat exchanger tube 41. For example, the tube main bodies 42 and the first cover layer 44 may possibly be distorted in the radial direction to cause the separation of the tube main bodies 42, the first cover layer 44, and the second cover layers 45. On the other hand, covering only part of the first cover layer 44 with the second cover layers 45 allows the tube main bodies 42 and the first cover layer 44 to deform in the portions not covered with the second cover layer 45 with allowance, and thus can prevent the separation of the tube main bodies 42, the first cover layer 44, and the second cover layers 45. Especially by not forming the second cover layer 45 on the grooved portions 46, each of the straight-tube portions 41a can easily deform independently. Accordingly, the damage of the heat exchanger tube 41 can be effectively prevented. Further, the smaller the area covered by the second cover layers 45 is, the higher heat conductivity the heat exchanger tube 41 can have, which is advantageous in that the temperature of the fluidized layer 10 can be efficiently adjusted.

As described above, the second cover layers 45 are formed by applying overlay-welding to the outer surface of the first cover layer 44. The overlay-welding can be automated by, for example, arc welding or the like using an automatic welding apparatus. Weld beads are extended along, for example, the length direction of the tube main bodies 42. When the second cover layers 45 are thus formed by hard-facing, there occurs fusion in boundary portions of the outer surface of the first cover layer 44 and the second cover layers 45, so that the second cover layers 45 can be surely joined to the first cover layer 44, and bonding firmness in this case is higher than when the second cover layers 45 are joined to the first cover layer 44 by, for example, spray welding and pressure welding. Therefore, it is possible to prevent the second cover layers 45 from being peeled off from the first cover layer 44 and to surely protect the first cover layer 44. Furthermore, since the second cover layers 45 are not easily peeled off from the first cover layer 44 even when suffering abrasion and impact for a long time, the heat exchanger tube 41 can have a longer life.

In the radial direction of the heat exchanger tube 41, each of the second cover layers 45 has a thickness smaller than a thickness of each of the tube main bodies 42. The thickness of the second cover layers 45 may be larger than the thickness of the first cover layer 44, and may be, for example, about 3 mm to about 6 mm. Incidentally, the thickness of the second cover layers 45 may be 3 mm or less, but in this case, there is a possibility that the second cover layers 45 cannot have sufficient performance since an excessive amount of a component of the first cover layer 44 is fused in the second cover layers 45. Another conceivable inconvenience is that the second cover layers 45 come to have uneven thickness. To avoid such inconveniences, processing conditions have to be optimized, which makes the processing difficult. On the other hand, increasing the thickness of the second cover layers 45 is advantageous in improving the strength of the second cover layers 45, but in a case where, for example, a chromium alloy or the like is used as the material of the second cover layers 45 as described above, making the second cover layers 45 too thick results in poor heat conductivity in the second cover layers 45 due to lower heat conductivity of the chromium alloy or the like than that of the material of the tube main bodies 42, which may possibly deteriorate a temperature adjustment function of the heat exchanger tube 41. Further, the larger the thickness of the second cover layers 45, the higher processing cost is required. Therefore, it is desirable that the second cover layers 45 have a thickness of about 3 mm to about 6 mm in view of the function of the second cover layers 45, workability of the overlay-welding, economic efficiency, and so on. In this embodiment, the second cover layers 45 have heat conductivity on the same level as or larger than heat conductivity of the first cover layer 44.

To manufacture the heat exchanger tube 41, the first cover layer 44 is first formed by applying overlay-welding to the whole outer surfaces of the tube main bodies 42 by arc welding, gas welding, or the like using an automatic welding apparatus. Thereafter, the second cover layers 44 are formed by applying overlay-welding to predetermined portions of the outer surface of the first cover layer 44 by arc welding, gas welding, or the like using the automatic welding apparatus.

In the heat exchanger tube 41 as structured above, the refrigerant supplied to each of the channels 43 in the heat exchanger tube 41 is heat-exchanged with the atmosphere outside the heat exchanger tube 41 or with the fluidized sand and the material to be incinerated in contact with the outer surface of the heat exchanger tube 41, via inner and outer surfaces of the heat exchanger tube 41. That is, the refrigerant supplied to each of the channels 43 in the heat exchanger tube 41 is heat-exchanged with the atmosphere outside the heat exchanger tube 41 or with the fluidized sand and the material to be incinerated in contact with the outer surface of the heat exchanger tube 41, via the tube main bodies 42 and the first cover layer 44, or via the tube main bodies 42, the first cover layer 44, and the second cover layers 45. Consequently, the outside atmosphere, the fluidized sand, the material to be incinerated, and so on are cooled to be adjusted in temperature. Incidentally, as shown in FIG. 1, the refrigerant is supplied to the heat exchanger tube 41 from an end portion of the straight-tube portion 41a on the lowest tier of the heat exchanger tube 41 and flows alternately in the straight-tube portions 41a and the curved portions 41b. The refrigerant flows from a lower side to an upper side in the straight-tube portions 41a while flowing alternately in opposite directions and is discharged from an end portion of the straight-tube portion 41a on the uppermost tier.

As shown in FIG. 1, a jet orifice 49 of a burner which jets flame to the secondary combustion chamber S2 is provided in the sidewall portion 6 of the furnace casing 2. The jetting of the flame from the jet orifice 49 promotes combustion of the exhaust gas that has risen from the primary combustion chamber S1.

An exhaust port 50 through which an atmosphere in the secondary combustion chamber S2 is discharged is open in an upper end portion of the inner rear surface 6b. An exhaust path 51 is connected to the exhaust port 50. The exhaust path 51 is connected to a bag filter 52. The atmospheres in the primary combustion chamber S1 and the secondary combustion chamber S2 rise in the secondary combustion chamber S2 to be discharged from the exhaust port 50. Then, after dust is caught in the bag filter 52, the atmospheres are discharged to the outside.

Next, the incineration disposal of a material to be incinerated using the fluidized-bed furnace 1 as structured above will be described. First, the material to be incinerated and fluidized sand which are put into the hoppers 13 are blended by the blenders 14, and by the operation of the dust feeders 15, they are continuously supplied into the primary combustion chamber S1 via the paths 12 and the inlet port 11 at a predetermined supply rate.

The material to be incinerated thus supplied into the primary combustion chamber S1 is, for example, shredder dust (ASR) which is a crushed residue of a discarded automobile from which recyclable components are removed. The ASR is produced when the discarded automobile is crushed in, for example, a discarded automobile disposal plant. The material to be incinerated such as the ASR contains, as inorganic substances, metal such as Fe, Cu, Zn, and Pb, glass, and so on and contains, as organic compounds, rubber, fiber waste, soft resin such as urethane, rigid plastic such as vinyl chloride, and so on.

While the fluidized sand and the material to be incinerated are continuously supplied into the primary combustion chamber S1, mixed gas of air and the exhaust gas from the secondary combustion chamber S2 is blown upward as fluidizing gas into the primary combustion chamber S1 from each of the gas blowing portions 21 to blow up the fluidized sand, thereby fluidizing the fluidized sand. In this manner, the material to be incinerated dropped with the fluidized sand is heated and incinerated while being stirred by the fluidized sand which has been fluidized. Consequently, combustibles such as resin and fiber waste in the material to be incinerated are thermally decomposed or combusted to produce exhaust gas (primary combustion gas) containing a gas component such as pyrolysis gas or oxidized gas. The exhaust gas rises from the fluidized layer 10 to head for the secondary combustion chamber S2 provided above the fluidized layer 10.

The fluidized layer 10 comes into contact with the heat exchanger tubes 41 of the heat exchanger tube group 40 to be cooled by the refrigerant flowing therein, so that its temperature is adjusted. Consequently, even if a calorie of the material to be incinerated is high, the temperature of the fluidized layer 10 is prevented from becoming excessively high, which enables stable combustion. The material to be incinerated such as ASR can be also stably combusted, which can reduce a cinder. The temperature of the fluidized layer 10 is kept at about 500° C. to about 1100° C. (for example, about 600° C. to about 800° C.).

While the fluidized layer 10 is fluidized, the fluidized sand and the material to be incinerated are actively fluidized around the heat exchanger tubes 41, and sharp and hard substances such as metal pieces and sand frequently collide with the surfaces of the heat exchanger tubes 41, and moreover, these surfaces are pressed from the outside by the fluidizing gas blown into the fluidized layer 10. Further, during the primary combustion, the inside of the furnace casing 2 is in a high-temperature state, and due to chemical reaction of the material to be incinerated, highly corrosive gas such as HCl or $Cl_2$ is generated in the furnace casing 2. Even in such a state, since the tube main bodies 42 of the heat exchanger tube 41 are covered and protected by the first cover layers 44, the fluidized sand and the material to be incinerated do not directly collide with the tube main bodies 42, and the component of the corrosive gas does not come into contact therewith. This effectively prevents the abrasion, breakage, corrosion, and the like of the tube main bodies 42. Moreover, owing to its excellent corrosion resistance, the first cover layer 44 is not corroded and can continue to protect the tube main bodies 42 even if exposed to the highly corrosive gas generated in the furnace casing 2 for a long time. Further, since the first cover layer 44 is very firmly joined to the tube main bodies 42 by overlay-welding, the first cover layer 44 does not come off the tube main bodies 42 and can continue to surely protect the tube main bodies 42 even if suffering an impact for a long time.

The fluidized sand and the material to be incinerated blown up vigorously from under collide especially with the straight-tube portions 41a, the curved portions 41b, and so on positioned on a lower tier side, but since the second cover layers 45 high in hardness are provided in places which suffer especially strong impact and pressure, the first cover layer 44 can be firmly protected. Owing to their excellent corrosion resistance, the second cover layers 45 are not corroded and can continue to protect the first cover layer 44 even if exposed for a long time to the highly corrosive gas generated in the furnace casing 2. Moreover, since the second cover layers 45 are very firmly joined to the first cover layer 44 by overlay-welding, the second cover layers 45 do not come off the first cover layer 44 and can continue to surely protect the first cover layer 44 even if suffering an impact for a long time.

The cinder of the material to be incinerated and the fluidized sand remaining after the incineration are discharged from the takeout port 30. Then, after the cinder is removed by screening with a sieve or the like, the fluidized sand is returned to the hoppers 13.

The exhaust gas risen to the secondary combustion chamber S2 from the primary combustion chamber S1 is heated in a lower end portion of the secondary combustion chamber S2 by being mixed with the flame supplied from the jet orifice 49. The exhaust gas rises in the secondary combustion chamber S2 while undergoing secondary combustion, and is discharged from the exhaust port 50 after unburnt gas and minute materials to be incinerated are combusted. Then, after fly ash and so on in the exhaust gas are collected by the bag filter 52, the exhaust gas is discharged to the outside.

According to the heat exchanger tube 41 of the fluidized-bed furnace 1, the tube main bodies 42 can be surely protected by the first cover layer 44 and the first cover layer 44 can be reinforced by the second cover layers 45. Forming the first cover layer 44 by overlay-welding makes it possible to firmly join the first cover layer 44 to the tube main bodies 42. Forming the second cover layers 45 by overlay-welding makes it possible to firmly join the second cover layers 45 to the first cover layer 44. Since the first cover layer 44 is provided between the tube main bodies 42 and the second cover layers 45, it is possible to prevent a crack from progressing to the tube main bodies 42 even if the crack occurs in the second cover layers 45. Therefore, the heat exchanger tube 41 can have sufficient durability and can have increased heat resistance, abrasion resistance, corrosion resistance, heat conductivity, and so on. Even if the heat exchanger tube 41 is exposed to a high-temperature and highly corrosive environment in the furnace casing 2, deterioration such as abrasion, damage, corrosion, and crack of the heat exchanger tube 41 can be prevented, so that the heat exchanger tube 41 can have a longer life. This can decrease the frequency of inspection, repairing, replacement, and the like of the heat exchanger tube 41. Moreover, cost such as labor expenses and equipment expenses required for the inspection, repairing, replacement, and the like of the heat exchanger tube 41 can be reduced.

Hitherto, a preferred embodiment of the present invention has been described, but the present invention is not limited to such an example. It is apparent that those skilled in the art could reach modified examples or corrected examples of various kinds within a range of a technical spirit described in the claims, and it should be naturally understood that such examples are also included in the technical scope of the present invention.

For example, the number of the straight-tube portions 41a in the heat exchanger tube 41 and so on are not limited to those shown in the above-described embodiment. Further, the heat exchanger tube 41 is described as having a substantially circular tubular shape and being composed of the straight-tube portions 41a and the curved portions 41b, but the shape of the heat exchanger tube 41 is not limited to this shape and may be, for example, an angular tubular shape. Portions where the first cover layers 44 and the second cover layers 45 are provided are not limited to the places shown in the above-described embodiment.

Figure 4:
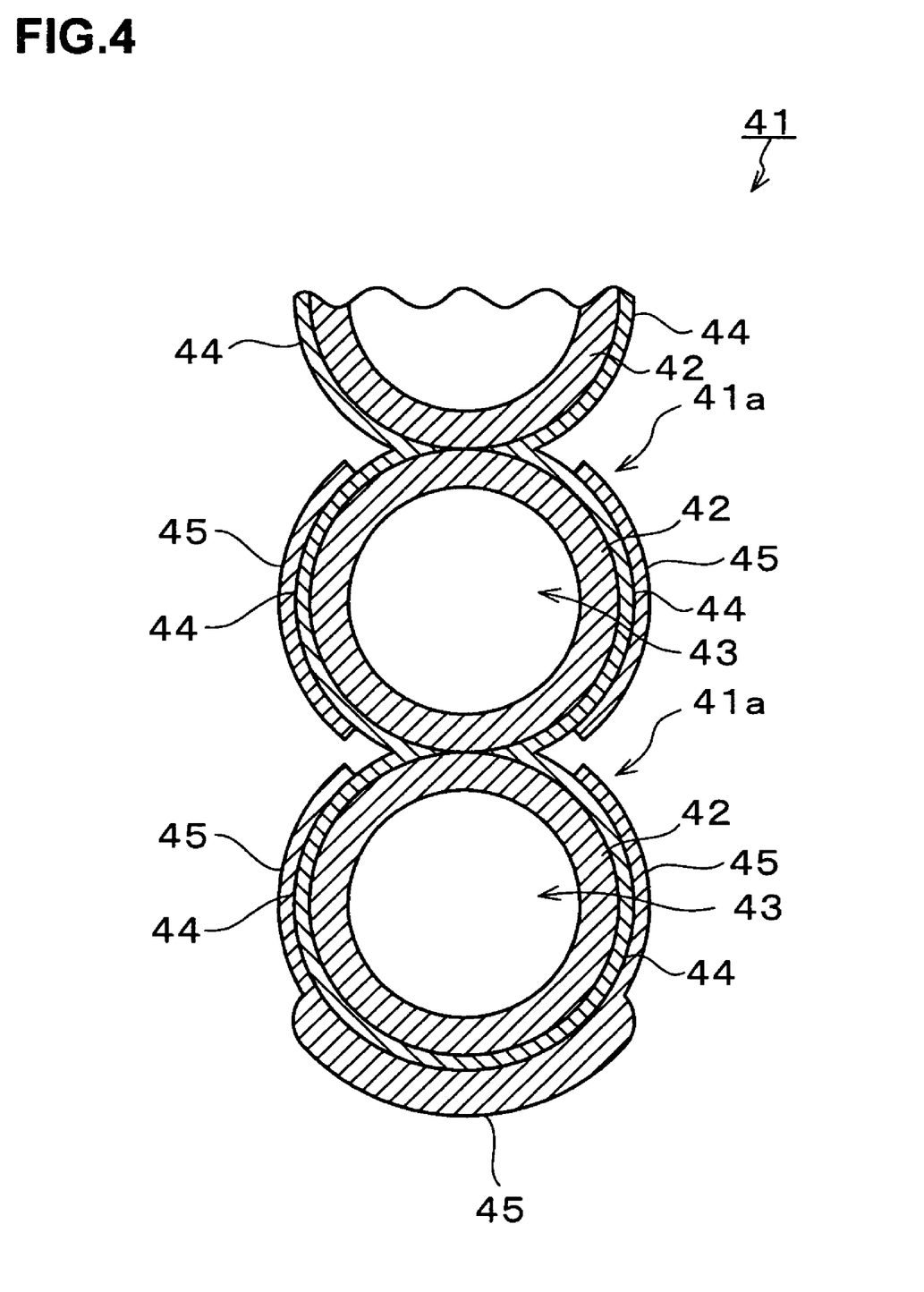
FIG. 4 is a vertical cross-sectional view of a heat exchanger tube according to an embodiment in which a thickness of a second cover layer is partly made large.

In the above-described embodiment, the second cover layers 45 have a uniform thickness, but may be partly thick and partly thin. For example, as shown in FIG. 4, on the lower surface of the straight-tube portion 41a on the lowest tier in the heat exchanger tube 41, the second cover layer 45 may be thicker than on the other portions. In this case, the lower surface of the straight-tube portion 41a with which the fluidized sand and the material to be incinerated are more likely to vigorously collide can be suitably reinforced. Further, on a front end portion of the heat exchanger tube 41, that is, on front surfaces of the curved portions 41b (curved surfaces on the inner front surface 6a side), the second cover layers 45 may be thicker than on the other portions, though not shown. In this case, it is also possible to suitably reinforce the front surfaces of the curved portions 41b with which the fluidized sand and the material to be incinerated are more likely to vigorously collide. Incidentally, in a case where the thickness of the second cover layers 45 on the other portions is, for example, about 3 mm, the thickness of the second cover layer 45 on the lower surface of the straight-tube portion 41a on the lowest tier and the thickness of the second cover layers 45 on the front surfaces of the curved portions 41b may be, for example, about 6 mm. Further, the thickness may be varied in such a manner that, for example, a single layer of the second cover layer 45 is overlaid on the other portions, and double layers of the second cover layer 45 are overlaid on the lower surface of the straight-tube portion 41a on the lowest tier and the front surfaces of the curved portions 41b.

Figure 5:
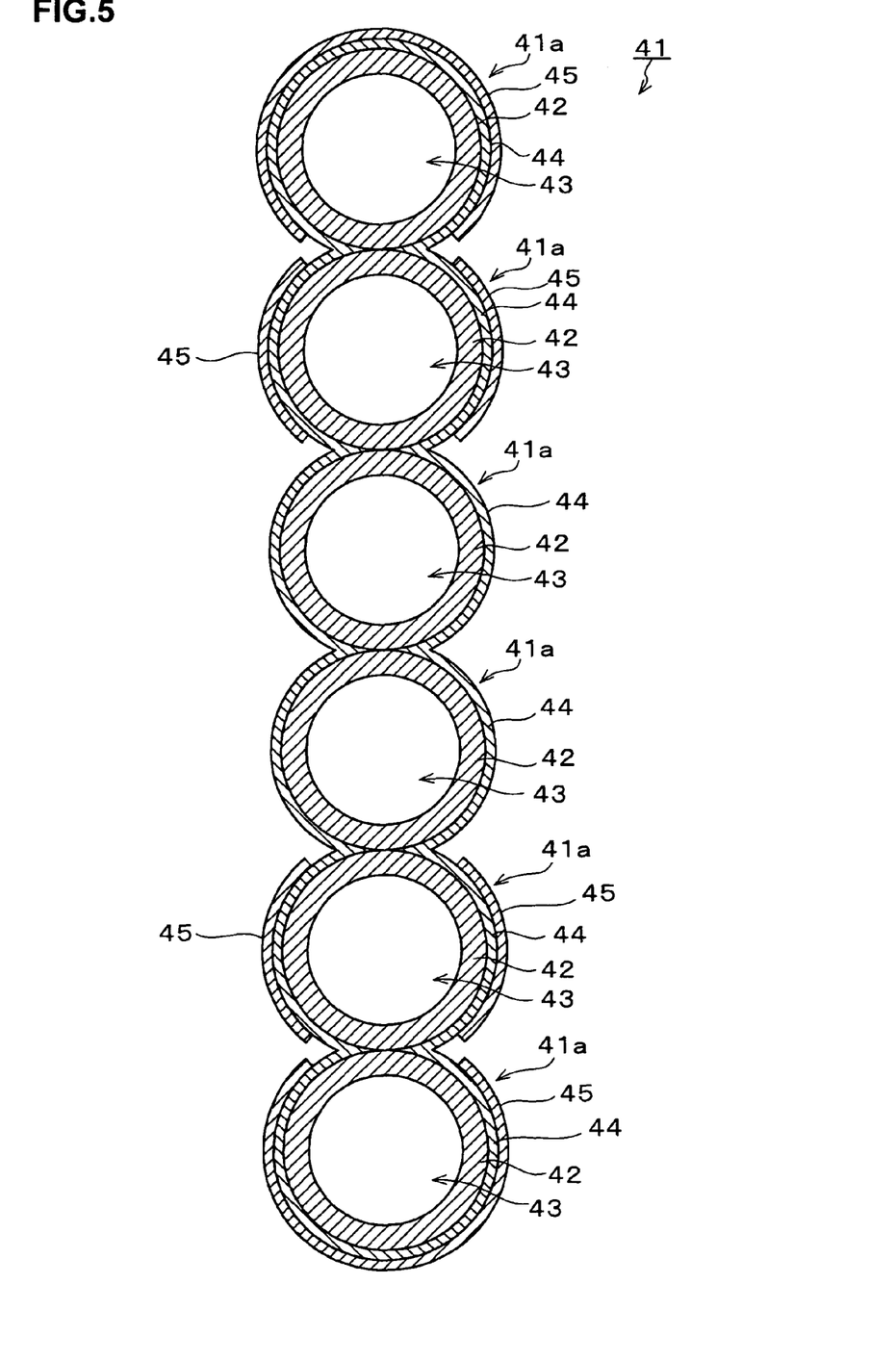
FIG. 5 is a vertical cross-sectional view of a heat exchanger tube according to an embodiment in which a second cover layer is formed also on an upper portion of the heat exchanger tube.

In the above-described embodiment, the second cover layer 45 is not provided on the straight-tube portions 41a on the third tier from the bottom to the uppermost tier, but, for example, as shown in FIG. 5, the second cover layers 45 may be also provided on the straight-tube portions 41a on the first and second tiers from the top. Alternatively, though not shown, the second cover layer 45 may be formed also on the curved portion 41b on the uppermost tier among the curved portions 41b facing the front side. Further, the heat exchanger tube 41 may have a vertically symmetrical structure. Specifically, as shown in FIG. 5, the second cover layer 45 with a substantially C-shaped cross section which is symmetrical to the second cover layer 45 on the straight-tube portion 41a on the lowest tier may be provided on the straight-tube portion 41a on the uppermost tier, and the second cover layers 45 may be provided on both sides of the straight-tube portion 41a on the second tier from the top as on the straight-tube portion 41a on the second tier from the bottom, and the second cover layer 45, though not shown, symmetrical to that on the curved portion 41b on the lowest tier may be formed on the curved portion 41b on the uppermost tier. This structure makes it possible to use the heat exchanger tube 41 in an upside-down state and thus is convenient. For example, the heat exchanger tube 41 may be turned upside down after being used for a predetermined period, and may be used again in a state where the straight-tube portions 41a which have been positioned on the upper side are positioned on the lower side to be buried in the fluidized layer 10, and the straight-tube portions 41a which have been positioned on the lower side are positioned on the upper side to be disposed above the fluidized layer 10. In this manner, even if the second cover layers 45 on the lower side deteriorate, the long-time use of the heat exchanger tube 41 is enabled by making full use of the second cover layers 45 on the upper side. This enables more effective use of the heat exchanger tube 41 than replacing the heat exchanger tube 41 with a newly manufactured heat exchanger tube 41, which can cut down on cost required for the heat exchanger tube 41.

Figure 6:
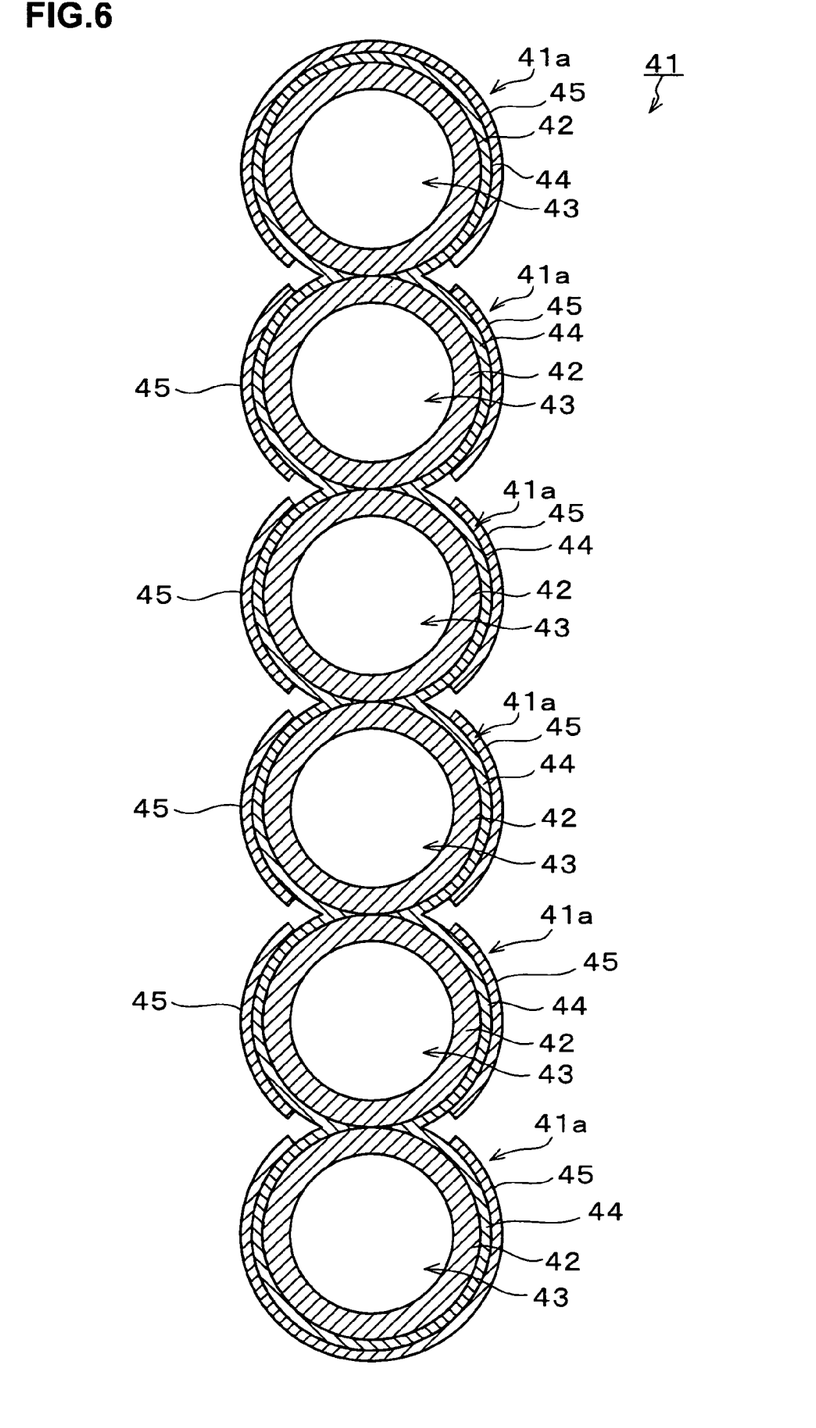
FIG. 6 is a vertical cross-sectional view of a heat exchanger tube according to an embodiment in which second cover layers are formed on all straight-tube portions of a heat exchanger tube.

Further, portions on which the second cover layers 45 are provided may be appropriately changed according to portions where the heat exchanger tube 41 is in contact with the fluidized layer 10. For example, in a case where the whole heat exchanger tube 41 is buried in the fluidized layer 10, the second cover layers 45 may be formed on the whole surface of the heat exchanger tube 41. For example, as shown in FIG. 6, the second cover layers 45 are preferably provided on both sides of the straight-tube portions 41a on all the tiers. Further, though not shown, the second cover layers 45 may be formed on the curved portions 41b on all the tiers where they face the front side.

Figure 7:
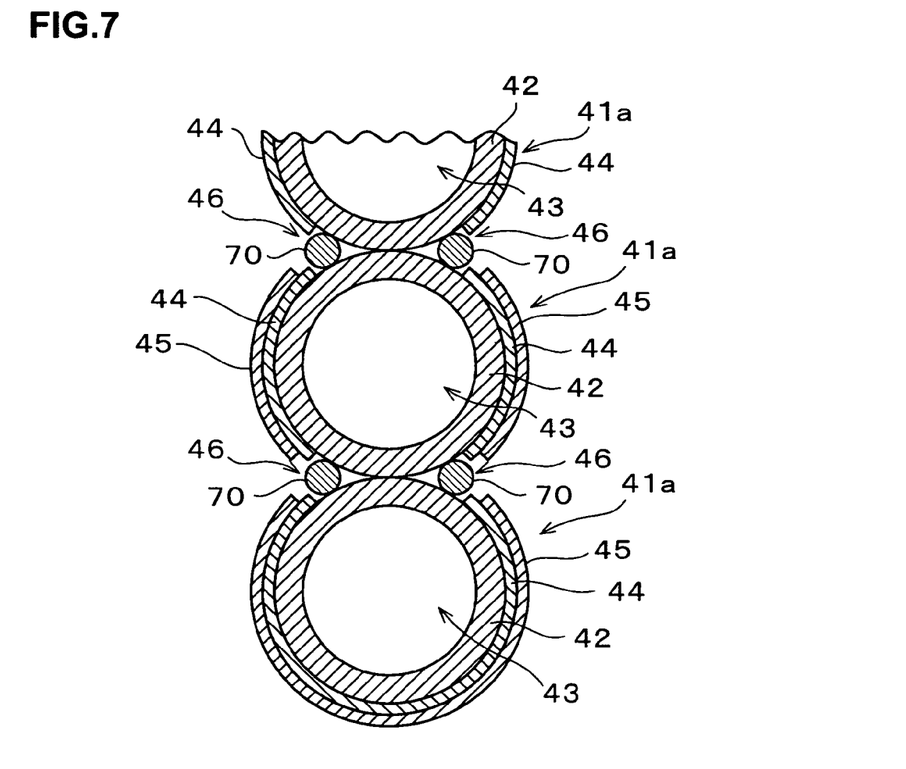
FIG. 7 is a vertical cross-sectional view of a heat exchanger tube according to an embodiment in which reinforcing members are provided.

As shown in FIG. 7, in the grooved portions 46 along portions between the tube main bodies 42, reinforcing members 70 may be provided to prevent the deformation of the straight-tube portions 41a. In the example shown in FIG. 7, one reinforcing member 70 in a substantially circular straight stick shape is attached in each of the grooved portions 46 positioned on both sides of the portion between the straight-tube portions 41a. Such reinforcing members 70 extend along the grooved portions 46 respectively, and are welded intermittently on a plurality of places at spaced intervals, on upper both side portions and lower both side portions of the outer peripheral surface of the tube main body 42 of each of the straight-tube portions 41a. Such reinforcing members 70 are joined to the tube main bodies 42 prior to the overlay-welding of the first cover layers 44. This can suitably prevent the thermal deformation of the tube main bodies 42 at the time of the overlay-welding of the first cover layers 44 and the second cover layers 45, resulting in improved workability of the overlay-welding and improved finishing state.

Materials of the tube main body 42, the first cover layer 44, the second cover layer 45, and so on are not limited to those shown in the above-described embodiment. Possible examples usable as the material of the second cover layer 45 instead of the chromium alloy are a cobalt alloy (for example, a Co—Cr—W alloy made of Co (cobalt) as a major component, Cr (chromium), W (tungsten), and so on, such as Stellite (registered trademark)). When such a cobalt alloy is used, the second cover layer 45 can also have sufficient heat resistance, corrosion resistance, and abrasion resistance, can have higher corrosion resistance than the tube main body 42, and can have higher hardness than the tube main body 42 and the first cover layer 44.

The above-describe embodiments show the heat exchanger tube 41 provided in the fluidized-bed furnace 1 as an example, but the heat exchanger tube according to the present invention is not limited to that provided in such a fluidized-bed furnace 1 but is applicable to heat exchanger tubes used in various apparatuses. For example, it may be a heat exchanger tube provided in a boiler and the like.

Figure 8:
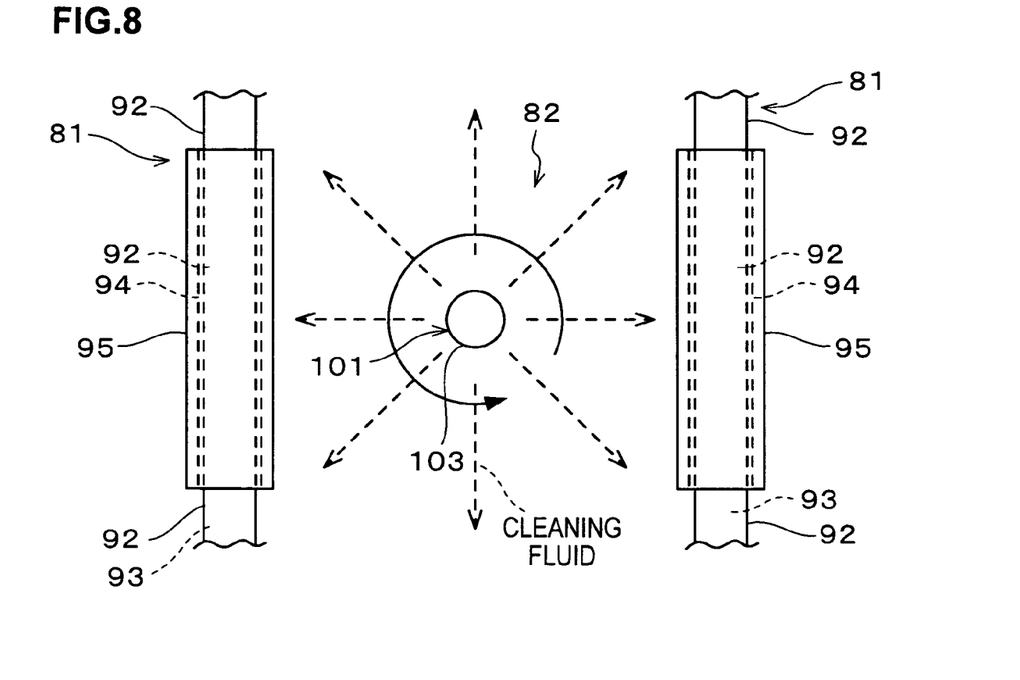
FIG. 8 is a schematic front view to illustrate the structure of heat exchanger tubes in a boiler and a soot blower.

Heat exchanger tubes 81 shown in FIG. 8 are installed in a boiler for recovering exhaust heat generated in, for example, an incinerator for incineration disposal of waste, and a refrigerant such as water is circulated therein. A plurality of the heat exchanger tubes 81 are installed in the boiler in substantially parallel to each other at predetermined spaced intervals to form a heat exchanger tube group. Further, in order to remove ash and clinker adhering to the heat exchanger tubes 81, provided is a soot blower 82 which jets cleaning fluid such as, for example, vapor at high pressure to the heat exchanger tubes 81.

Figure 9:
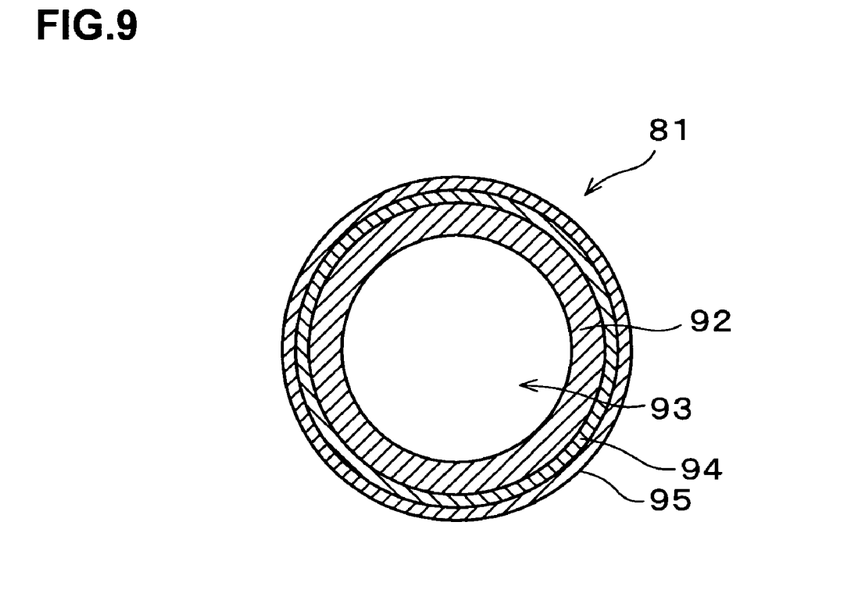
FIG. 9 is a horizontal cross-sectional view of the heat exchanger tube of the boiler.

As shown in FIG. 9, the heat exchanger tube 81 includes a substantially circular-tubular tube main body 92 with substantially uniform outside diameter and inside diameter, and an inner space of the tube main body 92 serves as a channel 93 with a substantially circular cross section through which the refrigerant such as, for example, water (vapor) is made to flow. Further, on an outer side of the tube main body 92, a first cover layer 94 covering part of the tube main body 92 and a second cover layer 95 covering the entire outer side of the first cover layer 94 are provided. The first cover layer 94 is provided partly in a longitudinal direction (height direction) of the straight-tubular tube main body 92 in a range to which the cleaning fluid from the soot blower 82 is sprayed (see FIG. 8), and in a circumferential direction of the tube main body 92, the first cover layer 94 is laminated to cover the whole outer peripheral surface of the tube main body 92. The second cover layer 95 is formed to cover the whole outer peripheral surface of the first cover layer 94. The first cover layer 94 is formed by applying overlay-welding to the outer peripheral surface of the tube main body 92. The second cover layer 95 is formed by applying overlay-welding to the outer peripheral surface of the first cover layer 94. In a radial direction of the heat exchanger tube 81, a thickness of the first cover layer 94 and a thickness of the second cover layer 95 are smaller than a thickness of the tube main body 92.

As the tube main body 92, used is, for example, a carbon steel tube for boiler/heat exchanger (low-carbon steel), an alloy steel tube for boiler/heat exchanger (low-alloy steel), or the like. The first cover layer 94 is made of a material having sufficient heat resistance and corrosion resistance and having ductility on the same level as that of a material of the tube main body 92, for example, austenitic stainless steel or the like. The second cover layer 95 is made of a material high in hardness, for example, a chromium alloy or the like.

Figure 10:
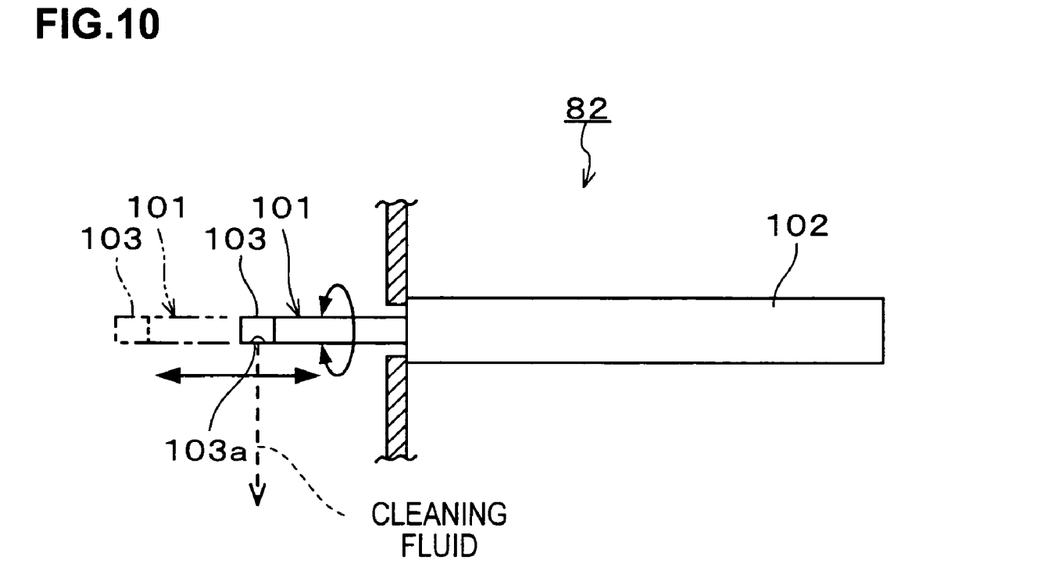
FIG. 10 is an explanatory view of the soot blower.

As shown in FIG. 10, the soot blower 82 includes a lance tube 101 moved forward into and backward out of the boiler and a driving part 102 driving the lance tube 101. The lance tube 101 is disposed with its longitudinal direction set substantially horizontal and moves straight along a substantially horizontal direction. Further, the lance tube 101 is rotatable around a longitudinal center axis as a rotation center. A nozzle 103 is provided on a tip of the lance tube 101. The cleaning fluid is supplied into the lance tube 101 to be jetted from a jet orifice 103a formed in the nozzle 103 to an outer surrounding area of the nozzle 103. Further, the nozzle 103 is moved forward and backward in a gap between the heat exchanger tubes 81 in accordance with the forward and backward movement of the lance tube 101. Further, the jet orifice 103a is rotated in accordance with the rotation of the lance tube 101, so that the cleaning fluid is sprayed to the outer surrounding area of the nozzle 103.

In such a structure, exhaust gas generated by the incineration of a material to be incinerated is discharged through the gap between the heat exchanger tubes 81 shown in FIG. 8, and at this time, the exhaust gas and the refrigerant in each of the heat exchanger tubes 81 are heat-exchanged with each other via each of the heat exchanger tubes 81, so that exhaust heat of the exhaust gas is recovered. When temperature of the exhaust gas drops due to such heat exchange, components in the exhaust gas aggregate on the outer surfaces of the heat exchanger tubes 81 and ash, clinker, and so on adhere thereon, which will be a cause of lowering efficiency of the heat exchange. To remove such ash and clinker adhering to the heat exchanger tubes 81, soot blowing is periodically performed by the soot blower 82. Specifically, the nozzle 103 is made to enter the gap between the heat exchanger tubes 81, and while the nozzle 103 is rotated, the high-pressure cleaning fluid is sprayed to the heat exchanger tubes 81 to blow out the substances adhering on the surfaces of the heat exchanger tubes 81. The cleaning fluid is sprayed to the outer surfaces of the second cover layers 95 formed on the heat exchanger tubes 81.

Being made of a material having sufficient corrosion resistance against the cleaning fluid and having high hardness, the second cover layer 95 is not easily corroded or abraded even when the soot blowing is performed. Therefore, it is possible to prevent drain attack from occurring in the heat exchanger tubes 81. That is, each of the tube main bodies 92 can be protected by the first cover layer 94 and the second cover layer 95. Further, the first cover layer 94 is firmly joined to the tube main body 92 by overlay-welding and the second cover layer 95 is firmly joined to the first cover layer 94 by overlay-welding. Moreover, even if a crack occurs in the second cover layer 95, it is possible to prevent the crack from progressing to the tube main body 92 owing to the first cover layer 94 provided between the tube main body 92 and the second cover layer 95. Therefore, the heat exchanger tube 81 can have sufficient durability and can have increased heat resistance, abrasion resistance, corrosion resistance, heat conductivity, and so on.

The present invention is applicable to, for example, a heat exchanger tube for temperature adjustment in a fluidized-bed furnace, a heat exchanger tube for recovering exhaust heat in a boiler, a fluidized-bed furnace, and so on.

What is claimed is:

1. A fluidized-bed furnace which incinerates a material to be incinerated while fluidizing a fluidized medium in a furnace casing, the fluidized-bed furnace comprising:
   a heat exchanger tube which is provided in the furnace casing and whose channel provided in a tube main body is heat-exchanged with an external part of the tube main body,
   wherein the heat exchanger tube forms a serpentine configuration having at least two straight tube main bodies extending in a longitudinal direction and a curved portion interconnecting respective adjacent ones of the at least two straight tube main bodies, the at least two straight tube main bodies extending parallel to each other and respective juxtaposed ones of the at least two straight tube sections linearly contacting one another at a contact location along the longitudinal direction; a first cover layer covering a tube main body outer side of each one of the tube main bodies to completely cover the contacting, juxtaposed ones of the tube main bodies except at respective contact locations; and a second cover layer covering a first cover outer side of the first cover layer on each one of the tube main bodies to partly cover the first cover layer, the second cover layer being at least arcuately-shaped as viewed in cross-section, covering the whole side portions of the straight-tube portion, and not provided on both sides of a place where the tube main bodies are in contact with each other, and an upper terminal end of a second cover layer on the lower tier is disposed apart from a lower terminal end of a second cover layer on the upper tier,
   wherein the first cover layer is made of a material higher in ductility than the second cover layer, and
   wherein the second cover layer is made of a material higher in hardness than the first cover layer.

2. The fluidized-bed furnace according to claim 1,
   wherein the first cover layer is formed by applying overlay-welding to the tube main body, and
   wherein the second cover layer is formed by applying overlay-welding to the first cover layer.

3. The fluidized-bed furnace according to claim 1, wherein the first cover layer and the second cover layer are made of materials higher in corrosion resistance against an external atmosphere than the tube main body.

4. The fluidized-bed furnace according to claim 1,
   wherein the tube main body is made of a material higher in heat conductivity than the first cover layer and the second cover layer, and
   wherein the first cover layer and the second cover layer are smaller in thickness than the tube main body.

5. The fluidized-bed furnace according to claim 1, wherein a material of the tube main body is carbon steel or low-alloy steel.

6. The fluidized-bed furnace according to claim 1, wherein the material of the first cover layer is austenitic stainless steel.

7. The fluidized-bed furnace according to claim 1, wherein the material of the second cover layer is a chromium alloy.

8. The fluidized-bed furnace according to claim 1, wherein the second cover layer is provided on a portion where the heat exchanger tube comes in contact with the fluidized medium.

9. The fluidized-bed furnace according to claim 1,
   wherein the plural straight-tube portions are disposed at different heights respectively, with a length direction of each of the plural straight-tube portions set in a lateral direction, and
   wherein the second cover layer is provided at least on a lower portion of a straight-tube portion positioned on a lowest tier among the plural straight-tube portions.

* * * * *